R. Tompkins,
Animal Trap.
No. 97,248.   Patented Nov. 23, 1869.

United States Patent Office.

ROBERT TOMPKINS, OF CLARKSVILLE, TENNESSEE.

Letters Patent No. 97,248, dated November 23, 1869.

IMPROVED ANIMAL-TRAP.

The Schedule referred to in these Letters Patent and making part of the same.

*To all whom it may concern:*

Be it known that I, ROBERT TOMPKINS, of Clarksville, in the county of Montgomery, and State of Tennessee, have invented a new and useful Improvement in Animal-Traps; and I do hereby declare that the following is a full, clear, and exact description of the construction and operation of the same, reference being had to the accompanying drawings, making a part of this specification, in which—

Figure 1:
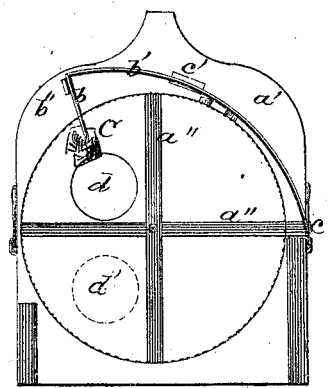
Figure 1 is a transverse vertical section.
Figure 2:
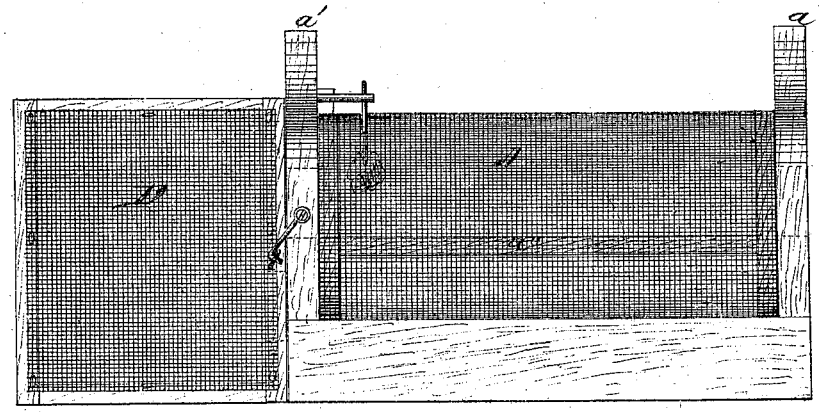
Figure 2 is a side elevation.

This invention consists of a cylinder of wire netting, mounted upon trunnions, so as to easily revolve, having a hole at one end, for the entrance of the victim, and near the other end the hook holding the bait, the shank of which hook passes out of the cylinder, and forms a bent arm, at the end of a spring-wire, on the outside of the netting, which arm rests against a pin, projecting from the standard to which the cylinder is pivoted, and is drawn away from such pin by the traction of the animal upon the bait, thus causing the weight of the animal to rotate the cylinder, until such rotation is checked by a stop, at a point where an egress is afforded from the cylinder into a retaining-box, immediately upon which egress of the animal the cylinder, relieved of its weight, rotates back to its original position, and is reset.

In the drawings—

A is the cylinder, pivoted in standards $a$ $a'$.

The cylinder is divided, by longitudinal partitions $a''$, into four compartments, into one of which the animal enters, through holes in the end of the partition, and in the standard C is the bait, suspended upon a hook, at the end of the bent arm $b$, which forms part of the spring-arm $b'$, fastened at one end to the outside of the cylinder, and bearing at the other end against a pin, $b''$, projecting from the standard $a'$.

The pull of the animal upon the bait draws the spring-arm $b'$ away from the pin $b''$, whereupon the weight of the animal causes the cylinder to revolve, until it is brought to a stand by the striking of the rib $c$ against the stop $c'$ on the standard $a'$.

This distance is just sufficient to bring the hole $d$, in the end of the cylinder, into correspondence with the hole $d'$ in the standard $a'$, through which hole $d'$ the animal naturally passes.

On its leaving the cylinder, the latter at once rotates, by its own weight, back to its former position, opening the holes in the end of the cylinder and standard $a$, so that another animal may enter.

The hole $d'$ opens into a retaining-box, D, where the animals are kept prisoners until such time as their fate may be decided upon.

Having thus described my invention,

What I claim as new, and desire to secure by Letters Patent, is—

The cylinder A, provided with the partitions $a''$, and combined with the standards $a$ $a'$, arms $b$ $b'$, rib $c$, and stops $c'$ $b''$, in connection with the box D, in the manner and for the purpose set forth.

R. TOMPKINS.

Witnesses:
T. W. KING,
BRYCE STEWART.